(No Model.)
P. J. LAWTON.
ADJUSTABLE DRIVING GEAR FOR CORN PLANTERS AND OTHER MACHINES.
No. 365,188. Patented June 21, 1887.
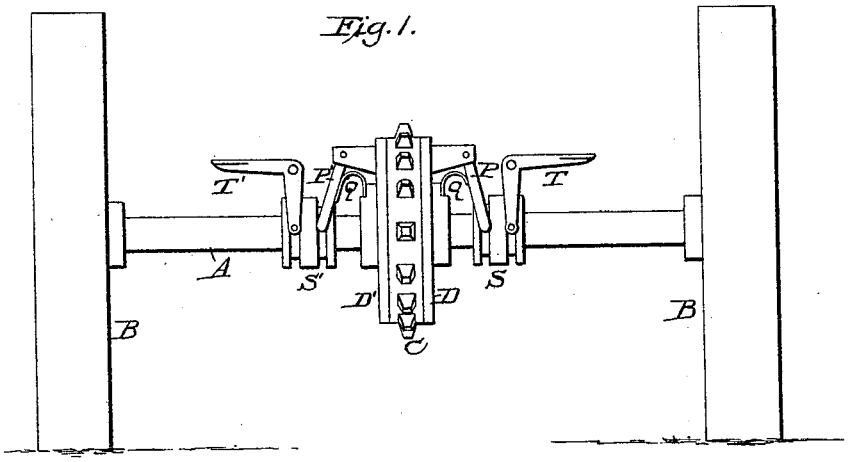
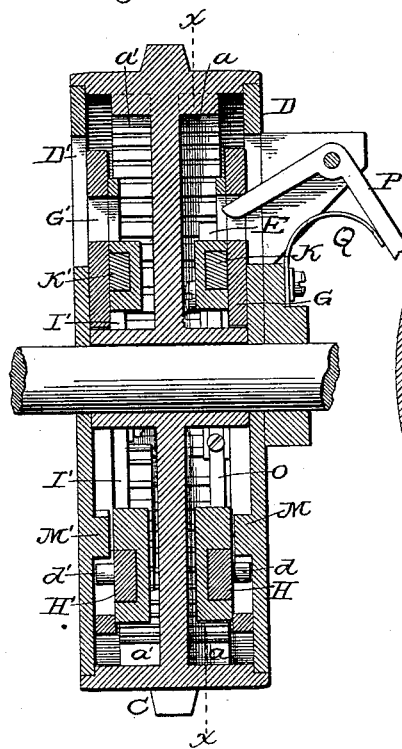
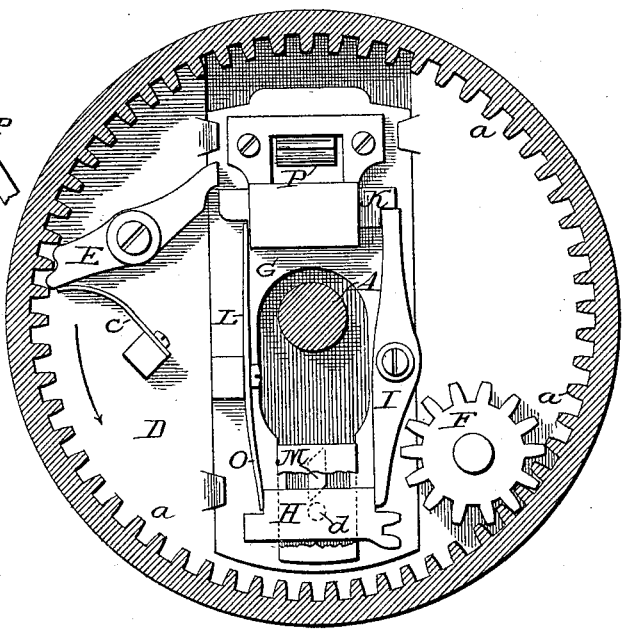
Witnesses:
James F. DuHamel
W. A. Kennedy
Inventor:
P. J. Lawton
By his Atty.
Phil. T. Dodge

United States Patent Office.

PHILIP J. LAWTON, OF JEFFERSON, IOWA.

ADJUSTABLE DRIVING-GEAR FOR CORN-PLANTERS AND OTHER MACHINES.

SPECIFICATION forming part of Letters Patent No. 365,188, dated June 21, 1887.

Application filed October 26, 1886. Serial No. 217,257. (No model.)

*To all whom it may concern:*

Be it known that I, PHILIP J. LAWTON, of Jefferson, in the county of Greene and State of Iowa, have invented certain Improvements in Adjustable Driving-Gear for Corn-Planters and other Machines, of which the following is a specification.

My invention relates to a mechanism whereby a wheel mounted on and driven by a rotating shaft may be turned forward or backward thereon at the will of the attendant and without affecting the motion of the shaft. The mechanism is adapted for application in many places and for various purposes, but is of special importance in corn-planting machines in which the dropping mechanism is actuated by ground-wheels.

In the operation of these machines the corn must be dropped at regular intervals or at regular distances apart. In practice it is found that the slipping of the ground-wheels in their passage over obstructions, and other circumstances, interfere with their uniform rotation, causing them at one time to increase and at another to diminish their speed in proportion to the distance traveled, the result of which is, that they operate the dropping mechanism at improper times and deposit the seed at improper places. By the use of my mechanism the attendant is enabled to adjust the mechanism in relation to the driving-shaft in such manner as to compensate for any irregular movement of said shaft, and thus insure the dropping of the seed at the proper point. The mechanism may be used, of course, with like effect in any and all places in which the driving-wheel requires to be turned forward and backward with reference to the shaft from which it receives motion.

In the accompanying drawings, Figure 1 represents in outline a sectional elevation of my mechanism applied to a shaft driven by ground-wheels, the purpose of this view being to illustrate the manner in which the mechanism is applied and operated. Fig. 2 represents a central axial section through the mechanism; Fig. 3, a transverse section of the same on the line $x$ $x$ of Fig. 2.

Referring to Fig. 1, A represents a horizontal driving-shaft, connected by clutches or otherwise with two ground-wheels, B, by which it is supported, and from which it receives a constant rotary motion in one direction.

C represents the driven wheel, mounted loosely on the shaft A, and receiving motion therefrom.

It is the office of my mechanism to transmit the motion from the shaft A to the wheel C, but permit a rotary adjustment of the wheel upon the shaft in a forward or backward direction, at the will of the attendant. The wheel C, as shown in the several figures, is mounted loosely on the shaft, that it may be turned forward or backward thereon, and has its rim provided on opposite sides with internal gear-teeth, $a$ $a'$. The periphery of the wheel may be provided with teeth, as shown, to drive a sprocket-chain with gear-teeth, or otherwise formed to impart motion to the other parts of the machine. On opposite sides of the wheel C, I secure firmly to the shaft two plates, D D', designed to support the intermediate parts through which the wheel receives motion. These plates and the various parts connected therewith are duplicates of each other, except that their driving-pawls are fixed in opposite directions, one being intended to turn the wheel forward and the other to turn it backward.

Referring to Figs. 2 and 3, it will be perceived that the plate D is provided on its inner face with a pawl, E, pivoted midway of its length and urged outward by a spring, $e$, into engagement at its outer end with the teeth $a$ of the wheel C, whereby motion is imparted from the rotating disk D positively to the wheel. The disk D is also provided with a pinion, F, pivoted loosely thereon and engaging constantly in the teeth of the wheel. During the ordinary operation of the parts, while the wheel is revolving at the same speed as the axle and disk, the pinion stands at rest and is inactive. The function of this pinion is to turn the wheel backward with reference to its driving-shaft when required. In order to turn the pinion for this purpose, and to unlock the pawl E, that the pinion may turn the wheel backward with reference thereto, I provide the devices which will now be described.

In suitable bearings on the inner face of the plate D, I mount a transverse slide, G, provided with a large central opening, through which the shaft passes, in order that it may not interfere with the sliding movement. In a suitable projection on one end of the slide I mount a transverse sliding pin, H, having at one end two teeth designed to engage and turn the pinion F. A lever, I, pivoted to the plate D, bears at one end against the front of the pin H and holds it normally backward out of engagement with the pinion. The upper end of the lever I is acted upon by a second sliding pin, K, also mounted in guides on the main slide G and urged forward by a spring, L, which latter serves through the intermediate parts to hold the pin H out of engagement with the pinion. The rear end of the sliding pin K stands normally beneath the rear or heel end of the driving-pawl E, as shown in the several figures, permitting the pawl to remain in engagement with the teeth of wheel C. The pinion-actuating slide H is provided on one side with a projecting stud, d, (see Fig. 2,) designed to travel around a cam or incline, M, formed upon or attached to the plate D, as shown in the several figures. A spring, O, attached to the plate D bears against the rear end of the sliding pin H and holds its stud normally in position, as shown in Fig. 3, opposite the lower end of the incline M. The parts stand normally in the position shown in Fig. 3, the pawl E engaging and driving the wheel C in the direction indicated by the arrow to permit the wheel to be revolved freely in the opposite direction. If, however, the slide G be moved endwise, it will carry the sliding pin H upward, and the stud on the side of this pin, engaging the under face of the cam M, will move the slide H forward until its teeth engage the pinion F. As this action occurs, the slide H will, through the lever I, move the slide K, causing the latter to act upon the dog E and disengage the same from the teeth of the wheel C. This disengagement of the dog being maintained, the continued movement of the main slide G causes the slide H to turn the pinion F, which in turn rotates the wheel C or permits it to rotate in a backward direction—that is to say, in the opposite direction from which it is turned by the dog E. As the movement of the main slide G is continued, the end of the slide K is finally carried past the dog E, which immediately resumes its engagement with the wheel C. The slide G may now be returned to its original position without further affecting the parts. This is due to the fact that the stud d, which ascended on the right side of the cam M, will descend on the left side, thereby holding the slide H out of engagement with the pinion F, and releasing the lever I, so that the slide K may pass freely over the heel of the dog. Each movement of the slide G has the effect, through the means above described, of turning the wheel C backward in reference to the disk and shaft the distance of one tooth. By repeating the movement of the slide, the wheel may be turned backward tooth by tooth to any required extent.

To effect the movement of the slide G, I propose to employ mechanism of any appropriate character, under the control of the attendant; but I recommend the employment, as shown in the drawings, of an angular lever, P, pivoted to the plate D, one end of the lever engaging the slide G, while the opposite end, projected on the outside of the plate, is acted upon by a spring, Q, which tends to return the slide to its normal position. The means for operating the levers P may be of any appropriate character. A simple arrangement for the purpose is that represented in Fig. 1, in which the outer end of the lever is seated in a peripheral groove in a collar, S, mounted on the shaft A, and movable longitudinally thereon at the will of the attendant by means of a lever, T. The depression of the lever T, moving the collar, causes the latter to operate the lever P, which actuates the slide G, as before explained.

The above constitutes the entire mechanism of one side of the wheel for turning the same in one direction. The plate D on the opposite side of the wheel is provided, as before alluded to, with devices which are in every respect similar to those above described, except that the driving-pawl faces in the opposite direction. The parts on plate D' corresponding to those on plate D are indicated by like letters of higher power. If it be required to turn the wheel in a backward direction, the operator moves the lever T. If it be required, on the other hand, to adjust the wheel in a forward direction, the result is secured by moving the lever T'.

The essence of my invention resides in the combination, with the driving-disks D D' and the driven wheel C, of intermediate devices, under the control of the driver, whereby the wheel may be turned forward or backward in relation to the disks at will; and it will be manifest to the skilled mechanic, after reading the specifications, that the details of the mechanism may be variously modified without changing its mode of action or departing from the limit of my invention.

Having thus described my invention, what I claim is—

1. In combination with a driving-shaft and a disk or hub fixed thereon, an internally-toothed wheel mounted loosely thereon, a driving dog or pawl connecting the disk and wheel, a pinion mounted on the disk and engaging the wheel, and a slide mounted on the disk and provided with means, substantially as shown, to disengage the dog and turn the pinion, whereby the wheel may be driven with the shaft or adjusted around the same at will.

2. The shaft, the wheel mounted loosely thereon, and the two disks fixed thereon, in combination with the oppositely-acting dogs on the respective disks, the loose pinions, and the two slides provided with the devices, substantially as described, for actuating the dogs and pinions.

3. The driving-shaft, the loose toothed wheel thereon, and the disks fixed thereon, in combination with the oppositely-acting dogs carried by the disks, the pinions, the slides G, provided with the devices for controlling the respective dogs and pinions, and lever-connections, substantially as described, for actuating the slides while the shaft is in motion.

4. In combination with the wheel C and the rotary disk or hub D, the pawl E, pinion F, slide G, slide H and its controlling-cam, lever I, slide K, and springs L O.

In testimony whereof I hereunto set my hand, this 4th day of October, 1886, in the presence of two attesting witnesses.

PHILIP J. LAWTON.

Witnesses:
JNO. B. CLINE,
J. E. CLINE.